July 6, 1965    R. W. ROE    3,193,327

RETRACTING DEVICE

Filed Nov. 5, 1963

INVENTOR.
Ronald W. Roe
BY
Hugh L. Fisher
ATTORNEY

United States Patent Office 3,193,327
Patented July 6, 1965

3,193,327
RETRACTING DEVICE
Ronald W. Roe, Royal Oak, Mich., assignor to General Motors Corporation, Detroit, Mich., a corporation of Delaware
Filed Nov. 5, 1963, Ser. No. 321,535
9 Claims. (Cl. 297—388)

This invention relates to a device for automatically storing an elongated flexible element and more particularly to a retracting device including means for automatically locking the flexible element against further withdrawal after a desired position is reached. While the device is of general utility, it is particularly useful in combination with safety seat belts.

Seat belts have gained increasing public acceptance as an important means of preventing or at least minimizing injuries to vehicle passengers during a collision or sudden stopping of the vehicle. In the interest of greater public safety, use of the seat belt should present a minimum of inconvenience to the motorist.

Conventionally, seat belts are formed of two straps of webbing each secured at one end to the floor or frame of the vehicle and provided with fastening means at the other end for securing the two straps around the user. Due to the various sizes of potential user, the seat belts are usually adjustable at the fastening means. Increasing the available length of the belt requires a certain amount of dexterity which may deter the use of the belt by those unfamiliar with the construction of the fastening means. Furthermore, a belt which is adjustable at the fastening means leaves an unsightly loose end when the belt is in use.

Another inconvenience of the present seat belt assemblies is that the passenger must place the seat belts on the seat when leaving the vehicle or otherwise they will fall on the floor where they may be stepped on or otherwise soiled or become caught in the door. When the belts are placed on the seat, they require attention by the passenger prior to entering the vehicle. To avoid this inconvenience, it has been proposed to provide a device for retracting the seat belt into a housing when not in use. The prior art retractors, however, either require that the seat belt be fully extended so as to provide a direct connection to the vehicle floor, in which case the inconvenience of adjustment at the fastening means still exists or require manual locking means within the retractor to prevent paying out of the excess belting during a sudden stop. The so-called inertia retractor, while requiring no adjustment and automatically locking in the event of a sudden stop, is apt to have an adverse psychological effect on the passenger who is never quite sure that the device will remain locked during a collision.

The disadvantages associated with the prior art seat belt retracting devices are obviated by the present invention wherein a device is provided which will automatically retract the seat belt when the seat belt is not in use and will automatically lock the belt against further withdrawal from the device after the belt has been fastened around the user.

A more complete understanding of the invention may be had from an examination of the detailed description which follows which should be read in conjunction with the drawings in which.

Figure 1:
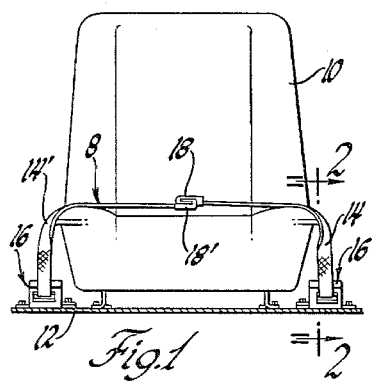
FIGURE 1 is an elevational view of the seat belt assembly of the present invention and showing the same in operative use within an automobile.

Referring now to the drawings and more particularly to FIGURE 1, a seat belt assembly generally designated 8 is shown associated with a seat 10 which is secured to the vehicle frame 12. The seat belt assembly 8 includes two elongated flexible belt portions 14, 14' of any suitable size and construction. One end of each of the portions 14, 14' is connected to a retracting device 16 while the opposite ends are secured to cooperating buckle parts 18, 18'. Each of the portions 14, 14' is normally housed within the retracting devices 16 but may be placed in use by the occupant of the seat merely extending the portions 14, 14' until the buckle parts 18, 18' are joined. Each of the portions 14, 14' is fixedly attached to the associated buckle parts 18, 18', there being no need for adjustment at the buckle as will be made apparent hereinafter.

Referring now to FIGURES 2–5, the retracting device 16 of the present invention comprises a reel generally designated 20 rotatably mounted in support means including L-shaped side walls 22 and 24 suitably secured to the vehicle frame 12. Power means in the form of a coil spring 26 is provided for normally, yieldingly, urging the reel 20 in a winding or clockwise direction as viewed in FIGURE 2. Locking means generally designated 28 are pivotally mounted in the retracting device 16 and are adapted to prevent rotation of the reel 20 in an unwinding or counterclockwise direction, as viewed in FIGURE 2, under certain conditions as explained below. Time delay means in the form of a dashpot mechanism are generally designated 30 and are operatively connected with the locking means 28 to prevent the locking of the reel 20 for a predetermined time after initial rotation of the reel 20 in an unwinding direction.

The retracting device 16 is provided with a generally U-shaped housing or cover 32 suitably secured to the side walls 22 and 24. An opening 34 is provided in the cover 32 to accommodate passage of the belt portion 14.

Figure 3:
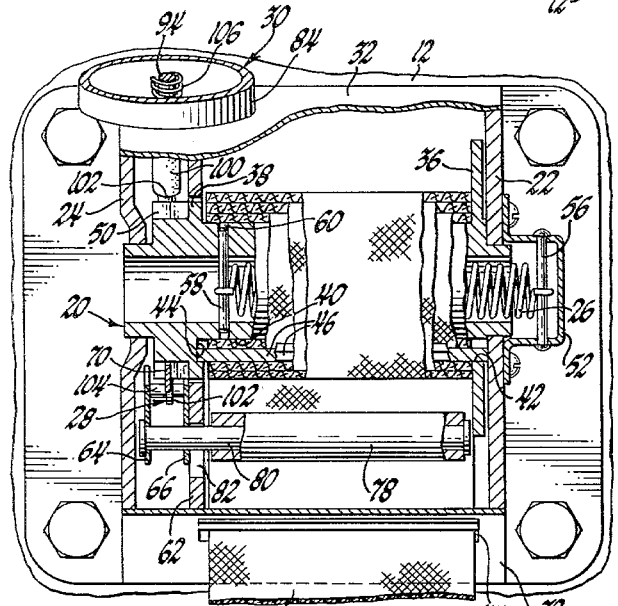
FIGURE 3 is a sectional view taken along lines 3—3 of FIGURE 2.

The manner in which the belt portion 14 is secured to the reel 20 will now be explained with reference to FIGURES 3 and 5. The reel 20 is provided with opposed flanges 36 and 38 and a portion of the reel 20 is milled as indicated at 40. An arcuate slot 42 is formed in the flange 36 and a corresponding blind slot 44 is formed in the flange 38. An arcuate belt securing member 46 is adapted to be inserted through the slot 42 and rest in the slot 44. The end of the belt portion 14 which is attached to the reel 20 is provided with a loop which receives the member 46 as it is inserted into the slots 42 and 44. The greater the pull on the belt portion 14, the harder the member 46 wedges the webbing against the milled portion 49 of the reel 20. This type of connection easily facilitates replacement of the belt portion 14 should it become necessary to do so.

One end of the reel 20 is provided with integral ratchet teeth 50 adapted to lock the reel 20 against rotation when engaged by the locking means 28. The other end of the reel 20 is covered by means of a cap 52 suitably secured to the side wall 22. The coil spring 26 is secured at one end to the cap 52 by means of a pin 56 suitably attached thereto and at the other end to the reel 20 by means of a pin 58 which is suitably secured to reel 20 as by insertion into aligned passages 60 formed therein. As indicated above the spring 26 normally tends to rotate the reel 20 in a clockwise direction so as to wind the belt portion 14 thereon.

Figure 4:
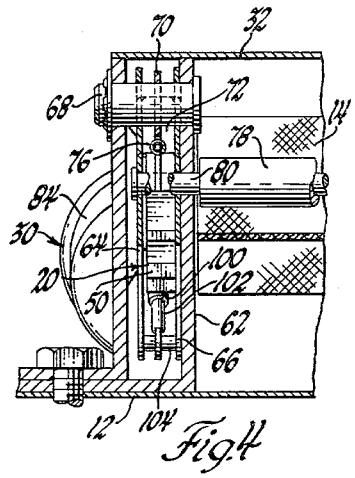
FIGURE 4 is a sectional view taken along lines 4—4 of FIGURE 2.

Referring now to FIGURE 4, an inner wall 62 of generally L-shaped cross section is suitably secured at the lower end thereof to the side wall 24. The locking means 28 comprises arms 64 and 66 pivotally mounted on a pin 68 extending between the side wall 24 and the inner wall 62. A pawl 70 is also pivotally mounted on the pin 68 between the arms 64 and 66. The arms 64 and 66 may be stamped from a single piece of metal to provide an integral pawl stop 72 and an inturned flange 74 on the arm 66. A pawl baising spring 76 has one end connected to the pawl 70 and the other end connected to the inturned flange 74 to normally maintain the pawl 70 in abutting engagement with the pawl stop 72. It will be apparent that while pivoting of the pawl 70 in a clockwise direction is dependent upon pivoting of the arms 64 and 66, the pawl 70 is nevertheless free to pivot in a counterclockwise direction against the bias of the spring 76. The reel 20 is thus free to rotate in a clockwise direction to take up slack in the belt portion 16 regardless of whether the pawl 70 is in engagement with the teeth 50 or not. While the reel 20 is capable of retracting the belt portion 14 while the pawl 70 is in engagement with the teeth 50, it is apparent that the pawl 70 must be pivoted out of the path of rotation of the teeth 50 before extension or withdrawal of the belt 14 is possible. In accordance with the preferred embodiment of this invention, the unlocking action is accomplished by the build up of the belt portion 14 on the reel 20. A roller 78 is rotatably mounted on a rod 80 which is connected in any suitable manner to the arms 64 and 66 and passes through an arcuate slot 82 formed in the inner wall 62. Thus as the belt builds up on the reel 20, the rod 80 rides in the slot 82 and pivots the arms 64 and 66 carrying the pawl 70 out of the path of movement of the teeth 50.

The dashpot assembly 30 comprises a cylinder 84 suitably secured at one end to the cover 32 and provided with a closure plate 86 at the opposite end. A piston 88 is provided with a small hole 90 and a one way valve generally designated 92. A piston rod 94 extends through aligned openings 96 and 98 in the cylinder 84 and the cover 32 respectively and is operatively connected by means of a flexible joint 100 with a second rod 102. The rod 102 is pivotally mounted on a pin 104 extending between and secured to the arms 64 and 66. A spring 106 surrounds the piston rod 94 with opposite ends thereof abutting the piston 88 and a washer 108 carried by the piston rod 94. The washer 108 provides an air tight bearing for the piston rod 94 thus preventing any air from escaping through the openings 96 and 98.

Figure 5:
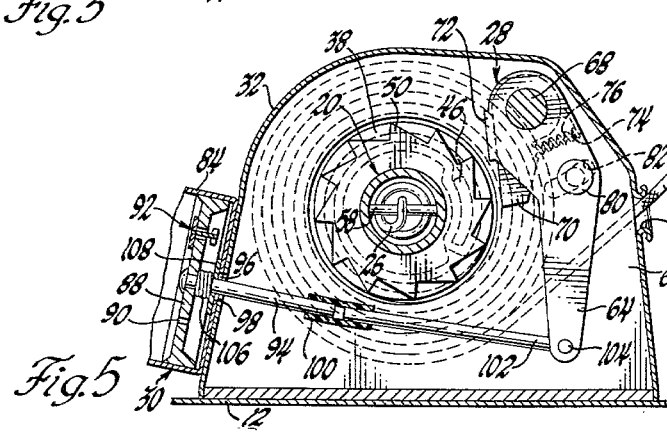
FIGURE 5 is a sectional view of the retracting device showing the seat belt in a retracted position.

Assuming that the seat belt assembly 8 has not yet been placed in use, the belt portion 14 will be fully wound on the reel 20 as shown in FIGURE 5. The build up of the belt will have caused the roller 78 to pivot the arms 64 and 66 and consequently the pawl 70 in a counterclockwise direction thus driving the piston 88 against the bias of the spring 106 to the position shown. As was inferred previously, the piston will move relatively easily to this position since the valve 92 is open.

Figure 2:
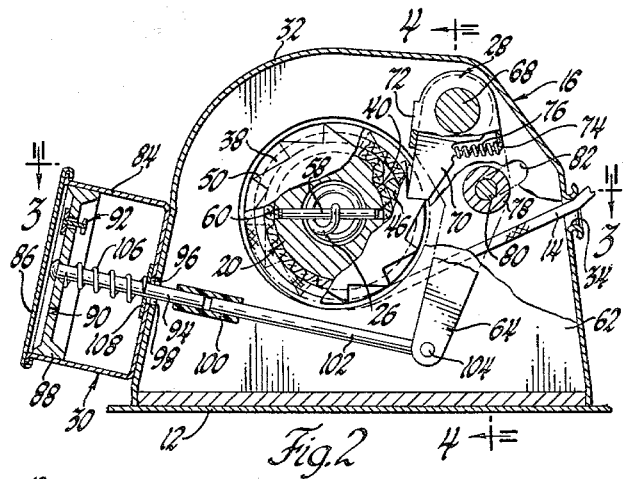
FIGURE 2 is a sectional view taken along lines 2—2 of FIGURE 1 showing the retracting device in a locked position.

Should the passenger now desire to place the seat belt 14 in use, he may do so by withdrawing the belt portion 14 from the retractor 16 thereby rotating the reel 20 in a counterclockwise direction against the bias of the spring 26. As indicated above, the pawl 70 is no longer in the path of movement of the teeth 50. As the belt is extended, the overall diameter of the reel and belting will decrease allowing the roller 78 to move toward the reel 20 in the arcuate slot 82 thereby pivoting the arms 64 and 66 in a clockwise direction. However, this movement is dependent on movement of the piston 88. The piston moves relatively slowly to the position shown in FIGURE 2 since the one way valve 92 is now closed. The time required for the piston 88 to move from the position shown in FIGURE 5 to that shown in FIGURE 2 is dependent on the size of the hole 90 and the strength of the spring 106. These variables have been designed so as to allow ample time for the passenger to connect the buckle parts 18, 18' prior to engagement of the pawl 70 with the teeth 50. When the arms 64 and 66 move to the position shown in FIGURE 2, the pawl 70 engages the teeth 50 thus preventing any further rotation thereof and thus securely fastening the passenger in the seat 10.

Although it is desirable in most instances to utilize two retractors as shown in FIGURE 1, it is feasible to use but a single retractor. In this instance one of the co-operating buckle parts 18, 18' is either rigidly secured to the seat frame adjacent one side of the passenger or is flexibly secured to a length of webbing which in turn is secured to the seat frame or vehicle floor.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A retracting device comprising support means, reel means rotatably mounted in said support means, an elongated flexible element coupled at one end thereof to said reel means and adapted to be wound thereon and unwound therefrom, power means normally, yieldingly, urging said reel in a winding direction, locking means mounted in said support means and adapted to lockingly engage said reel means when said element is unwound from said reel means, time delay means operatively connected with said locking means for delaying engagement thereof with said reel means for a predetermined time.

2. A retracting device comprising support means, reel means rotatably mounted in said support means, an elongated flexible element coupled at one end thereof to said reel means and adapted to be wound thereon and unwound therefrom, spring means for normally, yieldingly, urging said reel in a winding direction, locking means pivotally mounted in said support means and adapted to pivot into locking engagement with said reel means when said element is unwound from said reel means, time delay means operatively connected with said locking means for delaying the pivoting thereof for a predetermined time.

3. A retracting device comprising support means, reel means rotatably mounted in said support means, an elongated flexible element coupled at one end thereof to said reel means and adapted to be wound thereon and unwound therefrom, spring means for normally, yieldingly, urging said reel means in a winding direction, said reel means including ratchet teeth on one end thereof, locking means including a pawl pivotally mounted in said support means, said pawl adapted to pivot into locking engagement with said teeth in response to unwinding of said element from said reel means, time delay means operatively connected with said locking means for delaying the pivoting of said pawl for a predetermined time.

4. A seat belt retracting device adapted to be mounted in a motor vehicle, said device comprising support means, reel means rotatably mounted in said support means, a seat belt secured at one end thereof to said reel means and adapted to be wound thereon and unwound therefrom, spring means for normally, yieldingly, urging said reel means in a winding direction, locking means mounted in said support means and adapted to lockingly engage said reel means in response to rotation thereof in an unwinding direction, time delay means operatively connected with said locking means for preventing engagement of said locking means with said reel means for a predetermined time after initial rotation of said reel in an unwinding direction.

5. Safety apparatus for a motor vehicle having a seat, said apparatus comprising a rotatable reel and a seat belt, said reel adapted to be mounted in support means in spaced relation with the seat, said belt having one end thereof connected with said reel, spring means normally, yieldingly, urging the reel in a direction to wind the belt thereon, locking means pivotally mounted in said support means and adapted to pivot into engagement with said reel for preventing rotation thereof in an unwinding direction while permitting rotation in a winding direction, said locking means adapted to pivot out of engagement with said reel in response to build up of said belt on said reel during retraction of said belt, and time delay means operatively connected with said locking means to delay pivoting of said locking means into engagement with said reel for a predetermined time after unwinding of said belt from said reel.

6. Safety apparatus for use in a motor vehicle having a seat, said apparatus comprising a retracting device mounted in said vehicle in spaced relationship with said seat, a seat belt having one end attached to said device and the other end carrying fastening means adapted to be coupled to complementary fastening means secured to said vehicle, said device comprising locking means adapted to lock said belt against withdrawal from said device while permitting retraction of said belt when said fastening means are released, time delay means operatively coupled to said locking means for delaying the operation thereof for a predetermined time after initial withdrawal of said belt from said device.

7. Safety apparatus for use in a motor vehicle having a seat, said apparatus comprising a retracting device and a first and second seat belt portion, said device being mounted in said vehicle in spaced relationship with said seat, one of said portions being connected at one end thereof to said device, means connecting one end of the other portion to said vehicle, releasable latch means connected to the other ends of said portions, said portions being adapted to be extended across the occupant of the seat to restrain movement therefrom, said device comprising locking means adapted to lock said belt against withdrawal from said device while permitting retraction of said belt when said latch means are released, time delay means operatively coupled to said locking means for delaying the operation thereof for a predetermined time after withdrawal of said seat belt from said retracting device.

8. A seat belt retracting device adapted to be mounted in a motor vehicle, said device comprising support means, a reel rotatably mounted in said support means, a spring connected between said support means and said reel, a seat belt connected at one end thereof to said reel and adapted to be wound thereon and unwound therefrom, said spring normally, yieldingly, urging said reel in a direction to wind the seat belt thereon, said reel having teeth integrally formed on one end thereof, a pawl pivotally mounted in the housing and adapted to engage said teeth to prevent rotation of the reel in an unwinding direction while permitting rotation of the reel in a winding direction, means pivotally mounted in the housing and adapted to move the pawl out of engagement with said teeth in response to the winding of the belt on the reel, a dashpot mechanism connected with said last mentioned means to prevent reengagement of the pawl with said teeth for a predetermined time after initial rotation of the reel in an unwinding direction.

9. A seat belt retracting device adapted to be mounted in a motor vehicle, said device comprising first and second side walls and an inner wall, a reel rotatably mounted in said side walls, a seat belt connected at one end thereof to said reel and adapted to be wound thereon and unwound therefrom, a spring connected between the reel and one of said side walls and normally, yieldingly, urging said reel in a direction to wind the seat belt thereon, said reel having integrally formed teeth on one end thereof, first and second arms pivotally mounted between one of said side walls and said inner wall, a pawl pivotally mounted between said first and second arms and on said one of said side walls and said inner wall, pawl stop means extending between said arms in abutting relationship with said pawl, an arcuate slot in said inner wall, roller means connected to said arms and extending through said slot and adapted to be moved in said slot by said belt as the belt is wound on and unwound from said reel, movement of said roller means pivoting said pawl into and out of engagement with said teeth, a dashpot mechanism comprising a piston connected to said arms and adapted to present little resistance to the pivoting of said arm in a direction to disengage said pawl from said teeth but to present a greater resistance to pivoting of said arms in a direction to engage said pawl with said teeth to provide a predetermined time interval between withdrawal of the seat belt from the retracting device and engagement of said pawl with said teeth.

References Cited by the Examiner

UNITED STATES PATENTS

| 2,557,313 | 6/51 | Quilter | 297—386 |
| 2,708,555 | 5/55 | Heineman | 297—388 |
| 2,754,073 | 7/56 | Holm | 297—385 |

FRANK B. SHERRY, *Primary Examiner.*

Notice of Adverse Decision in Interference

In Interference No. 95,346 involving patent No. 3,193,327, R. W. Roe, RETRACTING DEVICE, final judgment adverse to the patentee was rendered Sept. 27, 1967, as to claims 1, 4, 6 and 7.

[*Official Gazette November 7, 1967.*]